PROPORTIONAL FLUID VORTEX AMPLIFIER

Filed Nov. 20, 1963

INVENTOR
PETER BAUER
BY Griffin and Stokes
ATTORNEYS 3,511,255

PROPORTIONAL FLUID VORTEX AMPLIFIER

Peter Bauer, Germantown, Md., assignor to Sperry Rand Corporation, New York, N.Y., a corporation of Delaware Filed Nov. 20, 1963, Ser. No. 325,125
Int. Cl. F15c *1/08*
U.S. Cl. 137—81.5 11 Claims

ABSTRACT OF THE DISCLOSURE

This invention provides a multistable vortex amplifier in which output signals are produced that are proportional to the magnitude of the input signals. The direction of flow is determined by the difference in the magnitude of the two input signals and means for sensing the direction of power stream flow from the amplifier are also provided.

The present invention relates to pure fluid multistable amplifiers for producing output signals proportional to the magnitude of input signals. More particularly, the present invention relates to multistable vortex amplifiers for producing power stream output signals, the direction of said output signals varying from a predetermined reference direction in proportion to the magnitude of control signals applied to the vortex chambers of said amplifiers.

In copending application Ser. No. 135,824 filed Sept. 5, 1961, and now U.S. Pat. No. 3,192,938, I disclose multistable fluid amplifiers wherein a high velocity power jet is deflected by control jets so that it flows along one or the other of two oval-shaped walls defining a fluid chamber. The chamber has an exit opening such that the power jet leaves the chamber and flows in one of two opposite directions depending upon which wall it has followed in moving through the chamber.

As disclosed in the aforementioned application, two or more control nozzles are prvided for selectively deflecting the power jet so that it flows along one or the other of the oval-shaped walls. Digital signals are applied to the control nozzles. That is, the fluid signals applied to the control nozzles are of sufficient magnitude to cause a definite switching of the amplifier from one stable state to another.

It has been found that vortex amplifiers of the type disclosed in the aforementioned application may also be utilized as proportional amplifiers. When used as a proportional amplifier the vortex amplifier produces a power stream output, the direction of said power stream as it emerges from the vortex chamber having a predetermined relation to the magnitude of the control signal input.

Therefore, an object of the present invention is to provide a multistable vortex amplifier, means for applying to said amplifier control signals of a magnitude insufficient to switch said amplifier from one stable state to another, and means for sensing the direction of power stream flow from said amplifier.

It has also been found that a multistable vortex amplifier may be utilized as a proportional amplifier for producing an output signal proportional to the difference between two input signals. Again, the output signal takes the form of a fluid power stream, the direction of flow of said power stream being determined by the difference in the magnitude of the two input signals.

An object of this invention is to provide a multistable vortex amplifier having a power stream nozzle and at least two opposing control nozzles, means for applying a power stream to the power stream nozzle and control signals to said control nozzles, and means for sensing the direction of power stream flow as it emerges from said amplifier, said direction of flow having a predetermined relation to the difference in magnitudes of the control signals.

A further feature of the invention is a half-amplifier which produces a fluid power stream output, the direction of flow of said power stream being proportional to the magnitude of an applied control signal. The half-amplifier comprises a power stream nozzle, an oval-shaped wall which diverges from and then converges toward the center line of said nozzle, and a control nozzle terminating at an orifice in said wall. Sensing means are provided for sensing the direction of power stream flow to thus determine the magnitude of a signal applied to the control nozzle.

A further object of the invention is to provide an analog-to-digital converter comprising a multistable vortex amplifier in combination with a plurality of sensing means, said sensing means being disposed about the power stream exit of said amplifier for selectively receiving the fluid power stream issuing therefrom.

Other features of the invention and its mode of operation will become apparent upon consideration of the following description and the accompanying drawing in which.

Figure 1:
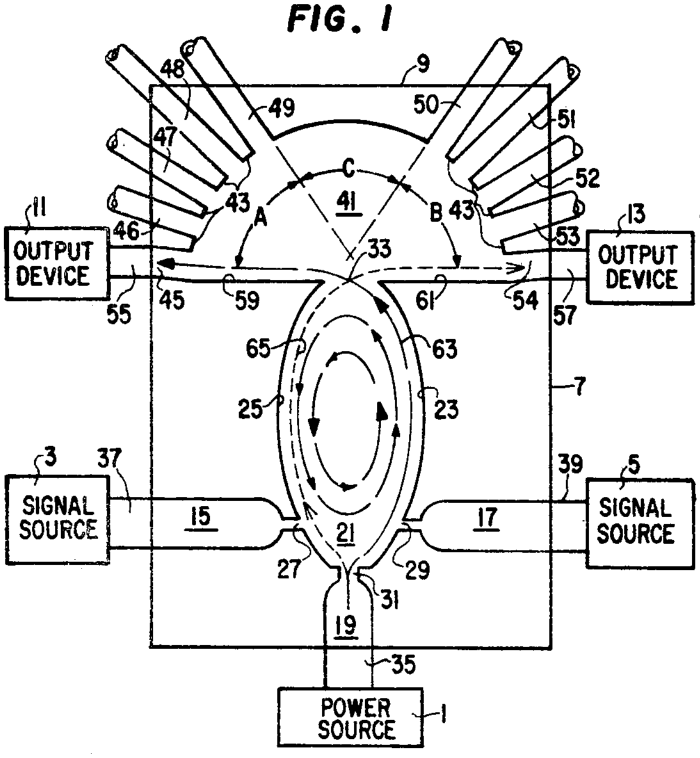
FIG. 1 shows a proportional amplifier for producing a fluid output signal proportional to either one of two fluid input signals.

The vortex amplifiers disclosed herein may be constructed in accordance with the techniques disclosed in my copending application Ser. No. 135,824 to which reference may be made for a complete description of fluid vortex amplifiers. As disclosed therein, the amplifiers may comprise three flat plates. The desired configuration of nozzles and chambers is cut, stamped or otherwise formed in one plate. This plate is then covered on both sides with the two remaining plates and all plates are fastened together in a fluid-tight relationship by screws or any suitable fastening means. The plates may be of a plastic, ceramic or metallic material. In order to more easily illustrate the channel and chamber configurations the amplifiers are shown in the drawings as being made of a clear plastic material.

The construction described above is given only for purposes of illustration. Other constructions and materials are equally adapted for use in fabricating amplifiers suitable for use in the present invention.

Referring now to FIG. 1, a first embodiment of the invention comprises a power stream source 1, first and second input sources 3 and 5, a fluid vortex amplifier 7, a sensing means 9, and a plurality of output devices two of which are shown at 11 and 13.

The amplifier comprises first and second control nozzles 15 and 17, a power nozzle 19 and a vortex chamber 21. Walls 23 and 25 are curved to give the vortex chamber an oval shape. Control nozzles 15 and 17 terminate at orifices 27 and 29, respectively, in walls 25 and 23. Power nozzle 19 terminates at an orifice 31 at one end of the chamber, the orifice being positioned such that a power stream issuing therefrom passes through the region between orifices 27 and 29. An opening 33 is provided at the end of the chamber opposite orifice 31 so that a power stream entering the chamber from the orifice may exit from the chamber.

Power source 1 continuously supplies a stream of fluid to nozzle 19 through a tube or other fluid conveying means 35. Source 1 may, for example, be a pump or compressor and preferably includes pressure regulating means of conventional design so that fluid may be applied to nozzle 19 under substantially constant pressure.

Signal sources 3 and 5 may be any suitable sources which produce fluid signals to be amplified. Sources 3 and 5 may produce digital pulses occurring only during discrete time intervals or they may produce analog signals which vary in amplitude over a range of values. The fluid signals produced by sources 3 and 5 are conveyed to control nozzles 15 and 17 by tubes 37 and 39, respectively.

The sensing means comprises a plurality of output devices such as 11 and 13 which connect with a chamber 41. A plurality of dividing elements 43 extend into the chamber and are arcuately disposed about the exit opening 33. The dividing elements form a plurality of passageways 45 through 54 for receiving a power stream emerging from opening 33. A suitable fluid conveying means such as tubes 55 and 57 may be employed to convey the power stream to the output devices.

The output devices may be fluid-to-electrical signal transducers, fluid operated logic elements, or simply fluid actuated indicators for indicating the magnitude of the signal applied to the amplifier.

As explained in my copending application, a vortex amplifier may be made to exhibit a bistable or tristable characteristic with the bisatable mode of operation occurring when the pressure of the power stream is below a predetermined minimum level and the tristable mode of operation occurring when the pressure of the power stream is above the predetermined minimum level. Power source 1 provides a power stream which emerges from orifice 31 at a pressure below the predetermined minimum. Hence amplifier 7, generally speaking, functions in the bistable mode.

The power stream emerging from orifice 31 will, in the absence of any forces acting against it in a transverse direction, tend to flow through chamber 21 and out the opening 33. However, when the pressure of the power stream is below a predetermined minimum the power stream is unstable and any slight disturbance along the boundaries of the stream deflect the stream. This disturbance may be the result of an unavoidable lack of symmetry in the vortex chamber. For purposes of the present description, it is assumed the lack of symmetry is such that it creates a disturbance tending to deflect the power stream toward wall 23.

The high velocity power stream emerging from orifice 31 entrains molecules of fluid from the regions between the power stream and the walls 23 and 25. If the power stream is closer to one wall, say wall 23, than the other wall it is more efficient in withdrawing molecules of fluid from the region adjacent this wall. This reduces the pressure in this region and the resulting transverse pressure acting on the power stream bends it closer to wall 23. The closer the power stream moves to wall 23 the more efficient it becomes in withdrawing molecules of fluid from the region adjacent this wall thus reducing the pressure adjacent this wall even further. The action is cumulative and in a very short time the power stream "locks on" to wall 23 and flows along the wall to the exit opening 33.

The opening 33 is formed by the intersection of chambers 21 and 41, this intersection being such that a power stream flowing along wall 23 passes through the opening and flows substantially parallel to wall 59. The power stream then passes through passageway 45 and tube 55 to activate the output device 11.

Once the power stream locks on to wall 23 a counterclockwise vortex is set up in the region between the power stream and wall 25. This vortex results in part from the viscous drag as the power stream moves adjacent the relatively still fluid in the vortex chamber. The vortex is further implemented by the oval shape of the chamber which causes a portion of the power stream moving through opening 33 to flow downwardly along wall 25. This positive feedback of a portion of the power stream aids in sustaining the vortex flow and in turn provides a positive pressure tending to force the power stream toward wall 23.

Thus, with no control signals being applied, the power stream follows the path indicated by arrows 63 and a counterclockwise vortex is established in chamber 21 which aids in maintaining this path of flow. This condition represents a first stable state of the amplifier..

Assume now that signal source 5 begins to produce a fluid signal which increases in magnitude. As the signal increases in magnitude proportionally more fluid flows through orifice 29 into the low pressure region adjacent wall 23. This increases the pressure in the region adjacent the wall and tends to deflect the power stream away from the wall. As the pressure increases the point at which the power stream locks on to wall 23 moves closer to exit opening 33 and since the wall is curved the angle at which the power stream strikes the wall becomes greater. As the angle of incidence becomes greater proportionally more fluid molecules from the power stream are deflected into the low pressure region adjacent the wall thus increasing the pressure in this region even further Also, as the input signal increases in magnitude the direction of flow of the power stream emerging from opening 33 changes. This is believed to be caused by the changing interaction between molecules of the power stream as they are reflected from the wall at gradually increasing angles. That is, as the input signal is increased the direction of flow of the power stream leaving opening 33 changes so that it first flows into passageway 46, then into passageway 47, then into passageway 48, and finally into passageway 49. Thus, power stream flow into a particular one of output passageways 45 through 49 is an indication of the magnitude of the fluid signal applied to nozzle 17 by source 5. If an input signal of a given magnitude causes the power stream to enter passageway 49 and this input signal is reduced in magnitude then the power stream swings in a counterclockwise direction and enters one of the channels 48, 47, 46 or 45 depending upon the decrease in magnitude of the input signal.

As the magnitude of the input signal is increased the pressure in the region adjacent wall 23 increases and the point of power stream lock on shifts as described above. If the input signal is increased sufficiently, the amount of fluid entering the region adjacent wall 23 becomes greater than the amount of fluid withdrawn from the region by the action of the power stream. At this time the pressure adjacent wall 23 increases to a value where power stream lock can no longer be maintained. The power stream breaks away from the wall 23 and tends to assume a path straight through the vortex chamber. However, the fluid issuing from orifice 29 directs the power stream toward wall 25. The power stream being closer to wall 25 now becomes more efficient in withdrawing molecules of fluid from the region adjacent this wall. Through the cumulative action described above, the power stream locks on to wall 25 and follows the path indicated by the broken line 65.

A major portion of the power stream flows through opening 33 and then moves along wall 61 and through passageway 54 to output device 13. A portion of the power stream flows downwardly along wall 23 and sets up a clockwise vortex flow which aids in holding the power stream against wall 25. When the power stream is flowing along wall 25 and into passageway 54 the amplifier is considered to be in its second stable state.

Amplifier 7 may also be employed to produce an output signal in one of the passageways 50 through 54 to thus give an indication of the magnititude of a fluid signal produced by source 3. When source 3 produces no output signal the power stream follows the path indicated by broken line 65 and enters passageway 54.

As the magnitude of the signal produced by source 3 is increased fluid flows from orifice 27 and enters the low pressure region adjacent wall 25 thus increasing the pressure in this region. As the pressure increases the point of power stream lock on moves closer to opening 33 and the power stream leaving opening 33 begins to swing in a counterclockwise direction, flowing into passageways 53, 52, 51 and 50 in that order. If an input signal of a given magnitude causes the power stream to flow into passageway 50 and this input signal decreases in magnitude then the power stream emerging from opening 33 swings in a clockwise direction and flows into one of the passageways 51 through 54 depending upon the magnitude of the decreased input signal.

If the magnitude of an input signal from source 3 exceeds a predetermined maximum value more fluid is supplied to the region adjacent wall 25 than can be removed by the power stream. The pressure in this region increases to the point where the power stream breaks away from wall 25 and again attaches to wall 23.

At the time the power stream breaks away from wall 25 the fluid emerging from opening 33 is flowing at an angle B with respect to its direction of flow when the amplifier is in its second stable state. As soon as the power stream locks on to wall 23 the power stream again flows along wall 59 and into passageway 45.

From the above description it is seen that the apparatus of FIG. 1 may produce at one of a first plurality of outputs a signal indicative of the magnitude of a first input signal and may produce at one of a second plurality of outputs a signal indicative of the magnitude of a second input signal. This is accomplished by using a single vortex amplifier which is time shared. The direction of fluid flow from opening 33 may be varied over the angle A in response to signals from source 5 and may be varied over the angle B in response to signals from source 3.

It should be understood that signal sources 3 and 5 should not simultaneously apply input signals to amplifier 7 if the output signal is to have meaning. The amplifier is set to its first stable state where it remains as long as the signal from source 5 is being amplified. When it is desired to produce an output signal proportional to the magnitude of a signal from source 3 the amplifier is first set to its second stable state.

This means for setting the amplifier to one or the other of its stable states may take many forms. For example, an additional pair of control nozzles (not shown) may be provided. Fluid signals of sufficient magnitude to switch the amplifier may be selectively applied to these nozzles to set the amplifier to a desired stable state.

If it is desired to determine the magnitude of signals from only one source, for example source 5, then signal source 3 may be a source of reset signals. The reset signals should be of sufficient magnitude to switch the amplifier from its second to its first stable state. This will permit the amplifier to be reset to its first stable state by a signal from source 5 of too great a magnitude.

Figure 2:
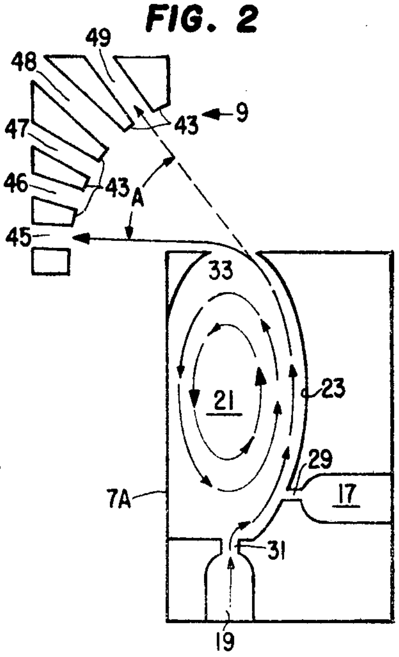
FIG. 2 shows a proportional half-amplifier for producing a fluid output signal proportional to the magnitude of a fluid input signal.

FIG. 2 shows an embodiment of the invention suitable for producing an output signal in the form of a fluid stream, the direction of the fluid stream varying from a predetermined reference direction in proportion to the magnitude of a fluid input signal. This embodiment employs a half-amplifier 7A of the vortex type. In many respects the device may be similar to that shown in FIG. 1 and corresponding elements bear like reference numerals.

Amplifier 7A differs from amplifier 7 in that it has only one control nozzle for receiving input signals and only one sidewall for defining the vortex chamber. Amplifier 7A does not have a sidewall such as sidewall 25 shown in FIG. 1 but is open on the left side so that fluid from the surrounding atmosphere may enter the vortex chamber.

Amplifier 7A functions in the following manner. A control stream is continuously applied to power stream nozzle 19 and emerges from orifice 31 as a high velocity jet stream. The high velocity jet enters chamber 21 and as it flows through the chamber it withdraws molecules of fluid from the regions immediately bounding it.

The region to the left of the power stream is open to the surrounding atmosphere so that additional fluid enters this region almost as fast as it is entrained by the power stream. However, wall 23 bounds the region to the right of the power stream so that additional fluid cannot enter this region as fast as it is withdrawn by the power stream. As a result, the pressure on the right side of the power stream drops below the pressure on the left side and the transverse force bends the power stream toward wall 23. As explained with reference to FIG. 1, the power stream withdraws proportionately more fluid from the region adjacent wall 23 as it moves closer to the wall and in a short time locks on to the wall and flows along the path indicated by arrows 63.

This curvature of wall 23 is such that the power stream, when it emerges from opening 33, is flowing substantially perpendicular to the center line of orifice 31.

Receiving means such as passageways 45 through 49 formed by dividing elements 43 are provided for determining the direction of power stream flow from opening 33. The power stream enters passageway 45 as long as a power stream is applied to nozzle 19 and no input signal is applied to nozzle 17.

When a fluid control stream is applied to nozzle 17 the fluid emerges from orifice 29 and flows into the low pressure adjacent wall 23 thereby increasing the pressure in this region and causing the power stream to lock on to the wall at a point further downstream.

As the point of lock-on shifts downstream the power stream emerging from opening 33 swings in a clockwise direction. Thus, depending upon the magnitude of the input signal to nozzle 17 the power stream flows into one of the passageways 46, 47, 48 or 49.

There is a predetermined maximum input signal to which the device may respond in a proportional manner. The power stream unlocks from wall 23 if the input signal to nozzle 17 causes fluid to enter the region adjacent wall 23 in sufficient quantity to raise the pressure in the region above the level required for lock-on. If the input signal exceeds this maximum the power stream unlocks from the wall and its own momentum as it emerges from orifice 31 tends to carry it straight through chamber 21. However, depending upon the magitude of the input signal, the power stream may even be deflected to the left as it leaves orifice 31 and may pass into the surrounding atmosphere.

Since the amplifier 7A is basically a monostable device, no source of reset signals is required. Assume that nozzle 17 is receiving an input signal of a magnitude great enough to deflect the power stream to the left as it emerges from orifice 31. Assume further that the magnitude of the input signal is slowly decreased.

As the input signal is decreased, the power stream bends in a clockwise direction as its own momentum tends to carry it straight through the vortex chamber. As the input signal is decreased still further it supplies less fluid to the region adjacent wall 23 than is removed from this region by the power stream. This deflects the power stream closer to wall 23 and it eventually locks on to the wall. At the time the power stream locks on to the wall it flows through opening 33 and follows the path indicated by the broken line so that it enters passageway 49. Any further decrease in the magnitude of the input signal results in a proportional decrease in the angle A. When the input signal is reduced to zero the power stream again flows into passageway 45.

Figure 3:
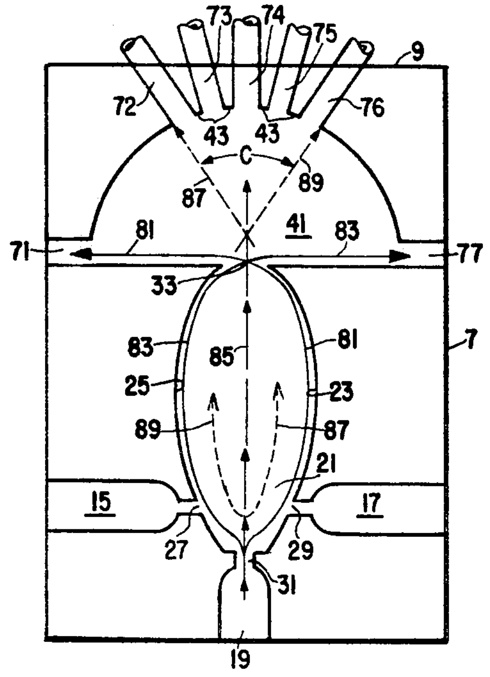
FIG. 3 shows a proportional amplifier for producing a fluid output signal proportional to the magnitude of the difference between two fluid input signals.

FIG. 3 shows a device for producing an output signal proportional to the difference between two input signals. This embodiment includes an amplifier 7 and a plurality of receiving means such as passageways 71 through 77 arcuately disposed about the exit opening of the amplifier.

Amplifier 7 has the same chamber and nozzle configuration as the amplifier of FIG. 1 and like elements are assigned the same reference numerals. However, the power stream source is chosen to produce a power stream which emerges from orifice 31 at a pressure greater than a predetermined minimum so that the amplifier exhibits a tristable characteristic.

As explained in my copending application a vortex amplifier may have three stable states of power stream flow if the power stream pressure is greater than a predetermined minimum. These stable states of flow are represented in FIG. 3 by the directional arrows 81, 83, and 85. When amplifier 7 is in its first stable state the power stream from orifice 31 flows straight through vortex chamber 21, opening 33 and chamber 41, and into passageway 74 which is positioned on the center line of orifice 31. When amplifier 7 is in its second stable state the power stream flows along wall 23, through opening 33 and into passageway 71. The third stable state is represented by power stream flow along wall 25, through opening 33 and into passageway 77.

The apparatus of FIG. 3 functions as follows. The power stream is applied to nozzle 19 and enters vortex chamber 21 at a pressure sufficient to overcome the effects of small unavoidable asymmetries of the chamber. Fliud control signals are applied to nozzles 15 and 17 and if the control signals are of equal magnitude their effects on the power stream cancel out. The power stream flows along path 85 and into passageway 74. Fluid flow into 74 is an indication that the control signals are of equal magnitude.

Fluid flow into passageway 75 or 76 is an indication that the control signal applied to nozzle 17 is greater than the control signal applied to nozzle 15. Assume that the magnitude of the control signal applied to nozzle 15 remains constant and the control signal applied to nozzle 17 is increased to a somewhat greater magnitude. The control stream entering chamber 21 from nozzle 29 deflects the power stream so that it flows to the left of path 85 as it moves through the vortex chamber. This path is somewhat oval in shape due to the wall configuration and the power stream leaves the vortex chamber in a direction which crosses the normal path 85. The power stream enters passageway 75 if the difference between the two input signals is a given value and enters passageway 76 if the difference is somewhat greater than said given value.

Fluid flow into passageway 72 or 73 is an indication that the control signal applied to nozzle 15 is greater than the control signal applied to nozzle 17. In this case the control fluid entering chamber 21 from nozzle 27 deflects the power stream so that it flows to the right of path 85 as it flows through the vortex chamber. As before, the configuration of the chamber is such that the power stream crosses path 85 after leaving the vortex chamber and enters passageway 72 or 73.

There is a maximum difference in the magnitude of the input signals for which the ampliefier can produce a proportional deflection of the output stream. Broken line 89 indicates the path of the power stream when this difference exists and the control signal applied to nozzle 17 is greater than the control signal applied to nozzle 15. Broken line 87 indicates the path of the power stream when this difference exists and the control signal applied to nozzle 15 is greater than the control signal applied to nozzle 17.

Assume for example that a signal applied to nozzle 17 is greater than the signal applied to nozzle 15 and the power stream is deflected so that it follows the path 89. Any further increase in the magnitude of the signal applied to nozzle 17 deflects the power stream so that it flows close enough to wall 25 to begin removing fluid from the region adjacent this wall. The power stream first locks on to the wall in the region where the wall converges toward opening 33. As soon as lock-on occurs in this region a swift action takes place during which the power stream suddenly withdraws fluid from the region between the wall and the power stream. This reduces the pressure in the region adjacent wall 25 and the point of lock-on shifts upstream along wall 25 toward orifice 31. As the point of power stream lock-on shifts upstream the direction of flow through chamber 41 suddenly shifts and the power stream flows through chamber 41 in a direction somewhere between path 89 and path 83, more generally in the direction of path 83.

If no control signal were being applied to nozzle 15 then the power stream would assume the path 83. However, the presence of a control signal at nozzle 15 causes some deflection of the power stream from path 83 as explained with reference to FIG. 1. The passageway 77 may be quite large if desired so that if the maximum allowable difference in input signals is exceeded the power stream flowing through chamber 41 will enter the passageway regardless of the magnitude of the signal applied to nozzle 15.

A similar sudden shift in the direction of fluid flow through chamber 41 occurs when the magnitude of the signal applied to nozzle 15 exceeds by a predetermined value the magnitude of the signal applied to nozzle 17. In this case the power stream locks on to wall 23 and the direction of flow in chamber 41 suddenly shifts from path 87 to a path approximating path 81. Passageway 71 may be made sufficiently large to receive the power stream when this occurs even though the magnitude of the signal applied to nozzle 17 may cause some variation in the direction of flow through chamber 41.

If the limit of the amplifier is exceeded so that the power stream locks on to one of the sidewalls it may be reset by terminating the fluid streams applied to the power stream and control nozzles. When the power stream is subsequently initiated it will flow along path 85 and into passageway 74 provided signals of equal magnitude, including zero magnitude, are present at nozzles 15 and 17.

The term proportional amplification as used herein includes but is not limited to, linear amplification. The degree of amplification is dependent upon the shape of the vortex walls, the spacing between the walls, the size of the control and power stream orifices, the type of fluid or fluids used and other factors.

While preferred embodiments of the invention have been described herein, various modifications and substitutions falling within the spirit and scope of the invention will be obvious. For example, in FIG. 3 the receiving passageways 72 through 76 might be replaced with a balanced, spring biased plate located perpendicular to flow path 85. In this case the force exerted on the plate along the axis of path 85 varies as the direction of flow of the power stream changes. Thus, the force exerted on the plate gives an indication of the difference in the magnitudes of the input signals. Other modifications falling within the spirit and scope of the invention will be obvious to those skilled in the art. It is intended therefore to be limited only by the scope of the appended claims.

The embodiments of the invention in which an exclusive property or privilege is claimed are defined as follows:

1. The combination comprising: means for defining a fluid chamber having at least one oval shaped wall and an exit opening; means for injecting a fluid power stream into said chamber and toward said opening, so that said power stream is selectively deflected to a plurality of positions, said oval shaped wall being adjacent to and extending along the path of said power stream whereby said power stream may lock on to said wall as a result of a low pressure region created therebetween; input signal means for varying the pressure in said region so as to enable a continuous angular variation of the direction of fluid flow from said exit opening through a plurality of positions; and means for sensing the direction of fluid flow from said exit opening.

2. The combination as claimed in claim 1 wherein said input signal means comprises a nozzle terminating at an orifice in said wall and means for applying a signal of variable magnitude to said nozzle, the direction of fluid flow from said exit opening varying from a predetermined reference direction in proportion to the magnitude of said variable signal as long as the power stream is locked on to said wall.

3. The combination as claimed in claim 1 wherein said direction sensing means comprises a plurality of fluid receiving means arcuately disposed about said exit opening for receiving fluid issuing therefrom.

4. The combination as claimed in claim 1 wherein said chamber is open on the side opposing said oval wall.

5. The combination as claimed in claim 4 wherein said magnitude indicating means comprises a plurality of fluid receiving means arcuately disposed about said exit opening for selectively receiving the power stream issuing therefrom as the direction of flow varies from said reference direction.

6. The combination comprising: means defining a fluid chamber having first and second oval shaped walls and an exit opening between said walls; means for injecting a fluid power stream into said chamber between said walls and toward said exit opening, so that said power stream is selectively deflected to a plurality of positions, the pressure in said power stream being less than a predetermined maximum whereby transverse forces acting on said power stream cause said power stream to lock on to one of said walls and exit from said opening in a predetermined direction in the absence of a control stream; a fluid control signal source; nozzle means responsive to said source for applying fluid to said chamber through said one wall to vary the transverse force acting on said power stream and thereby vary the point at which the power stream locks on to said one wall; so as to enable a continuous angular variation of the direction of fluid flow from said exit opening, and a plurality of fluid receiving means disposed about said exit opening for sensing the direction of fluid flow therefrom.

7. The combination as claimed in claim 6 and further comprising: means for locking said power stream on the other of said walls; a second fluid control signal source; second nozzle means responsive to said second source for applying fluid to said chamber through said other wall to vary the transverse force acting on said power stream and thereby vary the point at which the power stream locks on to said other wall; and a second plurality of fluid receiving means disposed about said exit opening for sensing the direction of fluid flow therefrom as the point of lock on to said other wall varies.

8. The combination as claimed in claim 7 wherein said first plurality of fluid receiving means are disposed on one side of an axis line extending from said injecting means through the middle of said exit opening and siad second plurality of fluid receiving means are disposed on the opposite side of said axis, all of said fluid receiving means being substantially coplanar.

9. The combination comprising: means for defining a substantially symmetrical fluid chamber having first and second oval shaped walls and an exit opening; nozzle means terminating at an orifice in one end of said chamber, said orifice being positioned to direct a fluid power stream along the axis of said chamber between said walls and through said exit opening; means for applying a stream of fluid to said nozzle means at a pressure sufficient to insure that said power stream normally maintains a stable path of flow substantially equidistant from said walls and through said exit opening; first and second control nozzles disposed on opposite sides of the path of said power stream; first and second signal sources for simultaneously applying fluid signals to said first and second control nozzles to thereby produce control streams for deflecting said power stream through a continuously variable angle to said axes from said normally stable path of flow in accordance with the difference in magnitudes of said fluid signals so that said power stream is selectively deflected to a plurality of positions; and a plurality of fluid receiving means arcuately disposed about said exit opening in said plural positions for receiving fluid issuing from said opening whereby fluid flow into one of said receiving means is an indication of the difference in magnitudes of said fluid signals.

10. The combination comprising: means defining an undivided fluid chamber having first and second oval shaped walls and an exit opening between said walls; means for injecting a fluid power stream into said chamber between said walls and toward said exit opening so that said power stream remains substantially intact while in said chamber to exit from said opening, the pressure in said power stream being less than a predetermined maximum whereby transverse forces acting on said power stream cause said power stream to lock onto either one of said walls and exit from said opening in a predetermined direction; a fluid signal source; nozzle means located in said first wall responsive to said source for applying fluid to said chamber through said first wall to vary the transverse force acting on said power stream and thereby vary the point at which the power stream locks onto said first wall so as to enable a continuous angular variation of the direction of flow of fluid from said exit opening so that said power stream flow from said exit opening may swing through a first substantial arc through a plurality of positions as determined by the transverse force acting on said power stream; a plurality of fluid receiving means disposed about said exit opening for sensing the direction of fluid flow therefrom when said power stream is locked onto said first wall; a second fluid control signal source; second nozzle means mounted in said second wall and responsive to said second source for applying fluid to said chamber through said second wall to vary the transverse force acting on said power stream and thereby vary the point at which the power stream locks onto said second wall so as to enable a continuous angular variation of the direction of flow of fluids from said exit opening while said power stream is locked onto said second wall so that said power stream flow from said exit opening may swing through a second substantial arc through a plurality of positions as determined by the transverse force acting on said power stream; and a second plurality of fluid receiving means disposed about said exit opening for sensing the direction of fluid flow therefrom as the point of lock onto said second wall varies; wherein said first plurality of fluid receiving means are disposed on one side of an axis line extended from said injecting means through the middle of said exit opening and said second plurality of fluid receiving means are disposed on the opposite side of said axis, all of said fluid receiving means being substantially coplanar.

11. Fluid flow control apparatus comprising a device having a fluid interaction chamber therein with a throat portion at one end thereof, said chamber having opposite side walls extending continuously in advancing directions with diverging and then converging portions to provide crossing fluid paths at said throat portion, said device having portions providing beyond said throat portion extensions of said paths, a nozzle communicating with said chamber between said walls at the other end thereof, a supply of fluid connected to said nozzle for the delivery of a fluid jet from said nozzle into said chamber, and control ports communicating with said chamber at each of said walls and contiguous to said nozzle for determining the positioning of the jet from said nozzle, the fluid flow through said throat portion being derived solely from said nozzle and said control ports.

References Cited

UNITED STATES PATENTS

| | | | |
|---|---|---|---|
| 3,128,040 | 4/1964 | Norwood. | |
| 3,135,291 | 6/1964 | Kepler, et al. | |
| 3,143,856 | 8/1964 | Hausmann. | |
| 3,177,888 | 4/1965 | Moore | 137—81.5 |
| 3,181,545 | 5/1965 | Murphy | 137—81.5 |

SAMUEL SCOTT, Primary Examiner